Sept. 17, 1974      S. C. VOLENT      3,836,619

METHOD OF FORMING ARTIFICIAL STONE

Filed Jan. 6, 1972      2 Sheets-Sheet 1

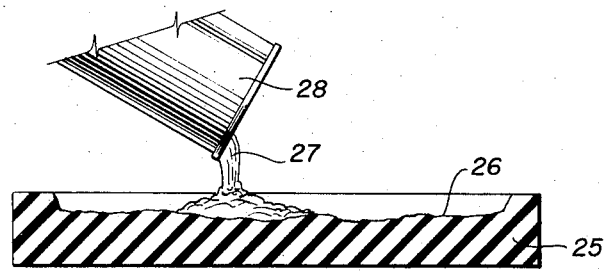
FIG. 4  STEP 18
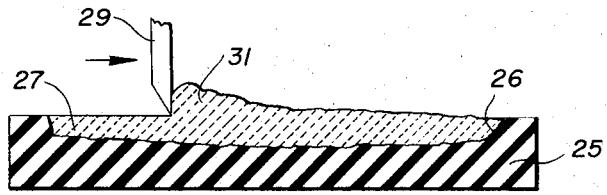
FIG. 5  STEP 19
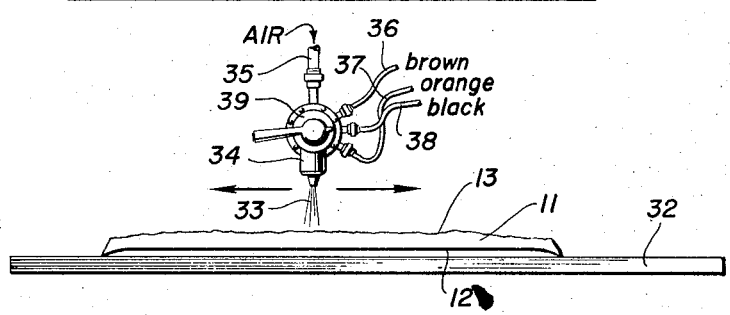
FIG. 6  STEP 21
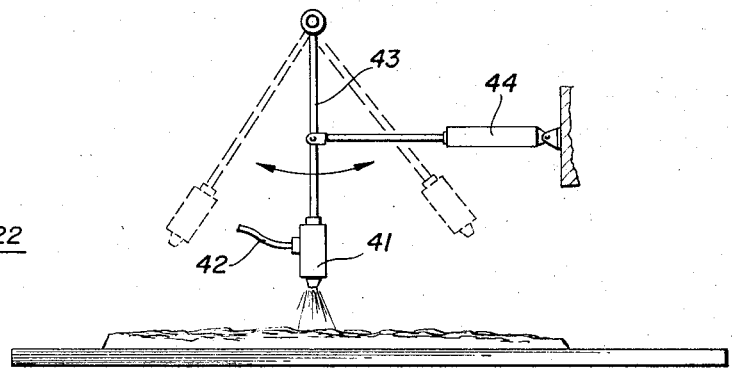
FIG. 7  STEP 22
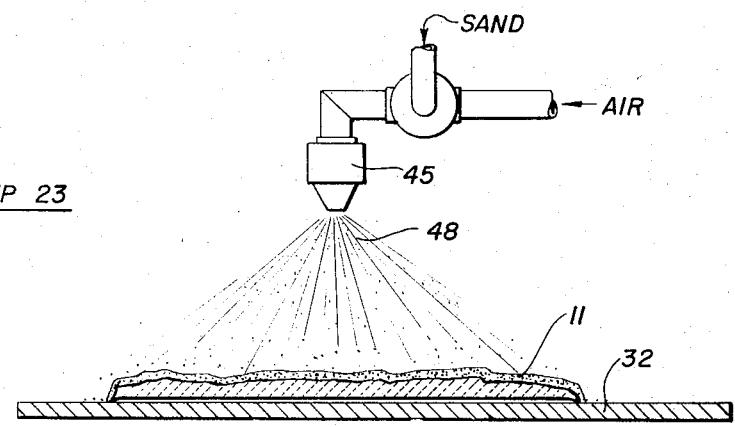
FIG. 8  STEP 23

United States Patent Office 3,836,619
Patented Sept. 17, 1974

3,836,619
METHOD OF FORMING ARTIFICIAL STONE
Stanley C. Volent, West Boylston, Mass., assignor to Dacor Manufacturing Co., Inc., Worcester, Mass.
Filed Jan. 6, 1972, Ser. No. 215,879
Int. Cl. B44d 1/094
U.S. Cl. 264—131                              3 Claims

ABSTRACT OF THE DISCLOSURE

Method of forming artifiical stone, comprising molding a main body, spraying the body with a color layer, spraying a transparent layer over the color layer, applying a layer of sand to the transparent layer while it is still tacky and curing.

BACKGROUND OF THE INVENTION

Since inexpensive plastics have been available, the manufacture of artificial brick for application to ordinary wall surfaces has become commonplace. Success has taken place, in the case of brick, particularly, because it is possible inexpensively to convert walls of insubstantial construction to the appearance of a real brick wall without the wall having the strength that is necessary if real bricks were to be used. When manufacturers have tried to do this with stone, however, a number of obstacles have arisen. If one attempts to mold stone in the same manner that one molds artificial brick, it has proved to be impossible to obtain a stone that looks like natural stone, particularly if the material being used is a plastic that is satisfactorily inexpensive. If one attempts to form the stone from a material such as concrete which has a texture resembling that of real stone, the color is usually bad, the artificial stone becomes very heavy. It is then difficult to apply to plastered walls, for instance, and the artificial stone becomes easily broken, so that it is difficult to ship and to store. These and other difficulties experienced with the prior art devices have been obviated in a novel manner by the present invention.

It is, therefore, an outstanding object of the invention to provide an artificial stone having the texture and color of real stone.

Another object of this invention is the provision of an artificial stone whose surface does not deteriorate in use.

A further object of the present invention is the provision of a method of making an artificial stone in which the coloration is controllable and variable, in which the texture is easily controlled, and the surface can be subjected to considerable abuse.

It is another object of the instant invention to provide a method of making artificial stone from inexpensive plastic while yet obtaining the texture and coloration of real stone.

A still further object of the invention is the provision of a method of making an artificial stone in which the color is controllable, but which color does not fade or chip with time.

It is a further object of the invention to provide a method of making artificial stone which permits considerable variation in shape of stone, in shading of the coloring, and of the exact nature of the texture.

With these and other objects in view, as will be apparent to those skilled in the art, the invention resides in the combination of parts set forth in the specification and covered by the claims appended hereto.

SUMMARY OF THE INVENTION

In general, the invention consists of an artificial stone having a main body of molded plastic, a layer of coloration, a gel coat of clear plastic, and a thin layer of sand-like substance locked into the surface of the gel coat.

More specifically, the method of forming the artificial stone consists of the steps of molding a filled polyester in open mold, removing the main body thus molded from the mold and laying it with a configured surface upright, spraying the surface in an indeterminate manner with a number of colors of paint, spraying the surface with a layer of clear liquid plastic, and sprinkling the surface with a sand-like substance.

BRIEF DESCRIPTION OF THE DRAWINGS

The character of the invention, however, may be best understood by reference to one of its structural forms, as illustrated by the accompanying drawings, in which:

FIGS. 4 through 8 are diagrams of the various steps of the method.

DESCRIPTION OF THE PREFERRED EMBODIMENT

Figure 1:
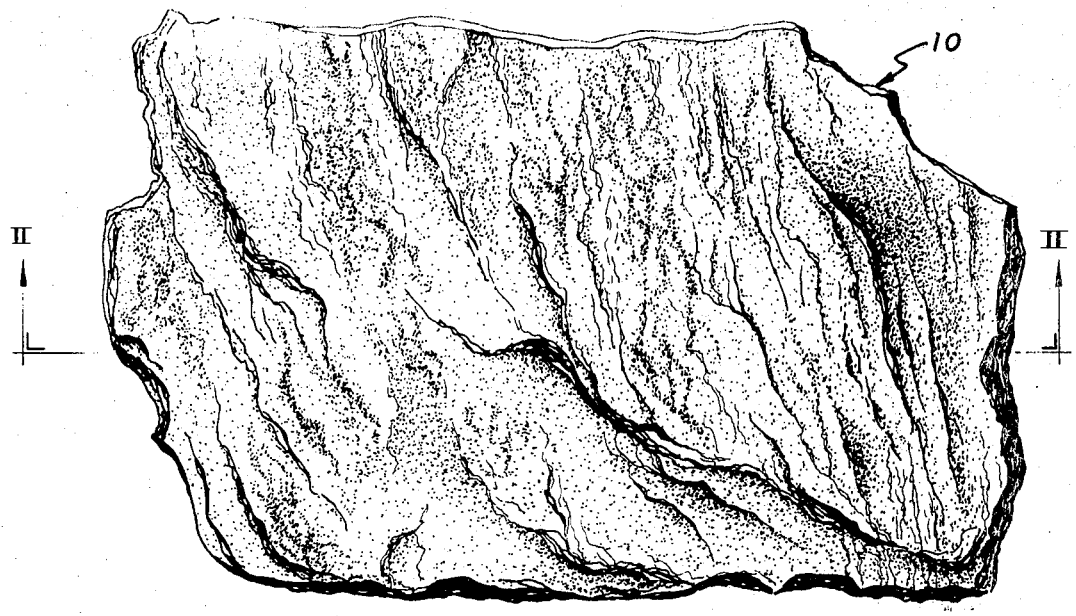
FIG. 1 is a perspective view of an artificial stone embodying the principles of the present invention.

Referring to FIG. 1, which best shows the general features of the invention, the stone, indicated generally by the reference numeral 10, is shown as consisting of a thin main body which has been provided with coloration and texture to resemble natural stone and which can be used with a mortar-like mastic to form a wall which has the appearance of a stone wall.

Figure 2:
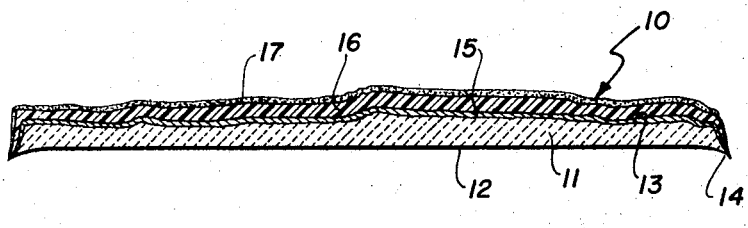
FIG. 2 is a sectional view of the stone taken on the line II—II of FIG. 1.

FIG. 2 shows some of the details of the stone. It can be seen that the stone consists of a main body 11 formed of a filled polyester plastic material or other inexpensive organic plastic and is provided with an undersurface 12 and an upper surface 13. The periphery of the undersurface 12 is provided with a lip 14 which is quite sharp in nature and which permits the stone to be pressed into the mastic and against the surface to which the stone is to be applied. This knife-like lip seats the stone against the wall very evenly to give a neat appearance and also serves to provide a hollow area in the back of the stone which makes it easier to "butter" with mastic during the application step. The upper surface is generally parallel and slightly spaced from the undersurface and is configured in the same way as the flat surface of a natural stone. This surface imitates the flat surface of the stone that would be selected to be exposed when a wall is formed from real stone and it contains all the irregularities, changes in curvature, texture, and so on that a real stone would have, but, because it is made from filled polyester plastic, it does not have the gritty feel of real stone. Also, because it is formed of a homogeneous plastic, it cannot possibly have the subtle shadings and differences in color of the surface of a real stone.

Overlying the upper surface 13 is a color layer 15 formed by unpatterned spraying with several colors of a paint that is chemically compatible with the plastic. In the preferred embodiment, the colors used are brown, orange, and black, the black having the major effect in determining not only the overall shade of the stone, but also variations in shade from one part of the stone to another. Over the color layer 15 lies a gel coat 16 consisting of a layer of clear polyester plastic. A gel coat is a layer of plastic which is not internally reinforced and which forms the outermost plastic layer of an object. It is cured non-contemporaneously with the interior material. Finally, over the gel coat and forming part of it, is a layer 17 of sand which is fairly thin, so that the color that coats layer 15 shines through it and yet which lends a gritty texture to the outside of the gel coat 16.

Figure 3:
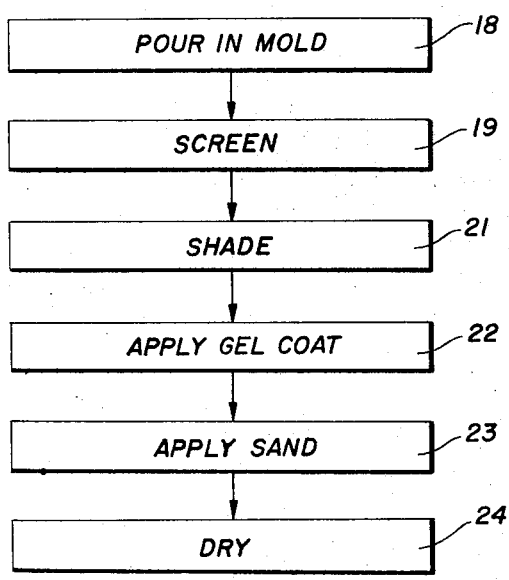
FIG. 3 is a flow chart showing in a general way the steps of the method of producing the artificial stone.

Referring now to FIG. 3, which shows the various steps in the manufacture of the stone, it can be seen that the first step 18 consists of pouring a mixture of the unhardened plastic and a catalyst in a mold to form the main body 11 of the stone. The next step 19 consists of passing a screed over the mold to remove excess plastic. Step 21 takes place after the main body has been removed from the mold and placed on the underside 12 with its upper surface 13 exposed. Step 21 consists of applying the color layer 15 and step 22 of applying the gel coat 16. The sand is applied in step 23 and, finally, the gel coat is allowed to dry.

FIG. 4 shows the details of step 8. The mold 25 is provided having an open-faced cavity 26. The mold is formed of an elastomer substance, such as rubber. The cavity 26 has a configured surface exactly similar to the upper surface 13 of the main body 11 of the stone. Liquid plastic 27 is poured into the cavity 26 from a container 28. The liquid plastic consists of a polyester which has been mixed with a catalyst of the peroxide type and also mixed with a filler, such as powdered limestone. The polyester may be also expanded by well-known commercial expanders, such as water, or a gas.

Step 19 is shown in FIG. 5. A screed 29 is drawn across the top of the mold. The lower edge of the screed is provided with a knife edge, and this tends to press the portion of the rubber-like mold downwardly in the vicinity of the area where the pressure of the screed is taking place at any given time. This causes the plastic 27 in the cavity 26 to be scraped off to a level lower than the normal upper level of the mold and a mass 31 of excess plastic is formed ahead of the screed. As the screed leaves a certain portion of the mold in its passage, that portion returns to its original shape and, by capillary attraction, pulls the edges of the body of plastic 27 upwardly to form the sharp lip 14 around the periphery.

In FIG. 6, the details of step 21 are shown. The main body 11 has been removed from the mold and laid on a board 32 with its upper surface 13 facing upwardly. A spray 13 of paint is applied to this surface and this is usually done by hand in an indeterminate manner. The spray emerges from a nozzle 34 and consists of a mixture of air introduced into the nozzle through a nose 35 with paint introduced into the nozzle through one of the hoses 36, 37, or 38. In the preferred embodiment, the hose 36 contains brown paint, the hose 37 contains orange paint, and the hose 38 contains black paint. A valve 39 selects which of the paints is to be blended with the air to form the spray 33.

In the preferred embodiment, the nozzle 34 is moved over the surface of the main body 11 at varying speeds and in various directions to give a blending and shaping effect. One color is applied at a time, and it is possible with a certain amount of discrimination to produce the coloration of natural stone.

FIG. 7 shows the details of step 22, which is the application of the gel coat 16. The main body 11, whose upper surface 13 already carries the color coat 15, is passed under a nozzle 41. The nozzle is supplied through a hose 42 with the clear liquid polyester already mixed with catalyst and forms a spray directed onto the surfaces of the stone. The nozzle 41 is mounted at the lower end of the rod 43 which is pivoted at its upper end to swing over the top of the stone like a pendulum, and this motion is provided by an actuator 44 which, in the preferred embodiment, is a pneumatic cylinder with suitable reversing valves and so on (not shown).

FIG. 8 shows the method of carrying out step 23, which is the application of the sand layer 17. A nozzle 45 overlies the path of passage of the main body 11 and provides a spray 48 of fine sand. It will be understood that other materials that are sand-like in nature could be used. The nozzle 45 is connected by a duct 46 to a mixer fan 47. This fan receives sand and air, mixes them together, and propels them through the duct 47 to the nozzle 46 to form the spray 48. The main body now carries its three layers, i.e., the color layer 15, the gel coat 16, and the sand coat 17, and is now dried in the usual way to be ready for use.

It can be seen, then, that the stone 10 has a main body 11 which is formed of a hard, but inexpensive, expanded polyester. Since the polyester normally has only a single color, the color layer 15 makes up for this deficiency and allows for variegated coloring and shading as is found in natural stone. In other words, the main body provides by means of its upper surface 12 a configuration, while the color layer 15 provides the color. The gel coat 16, which is clear yet very hard, protects the color layer from chipping and wear. Finally, the sand layer 17 provides the gritty consistency of natural stone, so that the finished stone 10 looks and feels like natural stone. The sand layer 17 is quite thin, so that the natural stone color shows through the gel coat 16 from the color coat 15. The method of making the described above allows for substantially automatic production line manufacture with good quality control. In a commercial embodiment of the invention, a large number of different molds are used, thus giving a series of main bodies which have a substantial variety in shape and size for use on a wall.

The only step that is done by hand is step 21, which is the coloring and shading step. At the present time, the somewhat indeterminate motions of the hand operation give the desirable differentiation and variety in shading and coloration and assists in making the successive stones all somewhat different. It is possible that, in the future, a mechanical means will be evolved which will give equally desirable results. The result of the present method, however, is the production of artificial stones which closely resemble natural stones, which are inexpensive and, yet, which are durable and capable of a long life without deterioration.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A method of forming an artificial stone, comprising the steps:
   (a) providing a flexible mold,
   (b) pouring a curable mixture of polyester plastic and catalyst in said mold to form a polyester plastic body having a configured surface,
   (c) scraping off excess of said curable mixture with a screed by applying sufficient pressure to said screed to depress the edges of said mold and form a raised lip on said plastic body,
   (d) curing said mixture,
   (e) removing said plastic body from said mold,
   (f) spraying the configured surface with a liquid color layer and drying,
   (g) spraying the color layer with a curable, transparent, liquid coat and curing said coat until the outer surface is gelled,
   (h) spraying a thin layer of sand on the outer surface of said transparent coat, and
   (i) curing said transparent coat, thereby bonding said said sand layer to the transparent coat layer.

2. A method of claim 1 wherein the transparent layer is sprayed on the plastic body in reciprocating motion.

3. A method of claim 1 wherein said transparent coat is a clear polyester plastic.

References Cited
UNITED STATES PATENTS

| | | | |
|---|---|---|---|
| 3,694,296 | 9/1972 | Frontino | 161—19 |
| 3,328,499 | 6/1967 | Barnett | 264—108 |
| 3,306,956 | 2/1967 | Barnett | 264—245 |
| 3,616,103 | 10/1971 | Greiner et al. | 161—19 |
| 3,435,577 | 4/1969 | O'Leary | 52—309 |
| 1,984,059 | 12/1934 | Dandini | 264—245 |
| 3,298,894 | 1/1967 | Barnett | 161—43 |
| 3,058,164 | 10/1962 | Rowe | 264—220 |
| 3,396,067 | 8/1968 | Schafer | 161—19 |

WILLIAM D. MARTIN, Primary Examiner

W. R. TRENOR, Assistant Examiner

U.S. Cl. X.R.

117—19, 27, 33, 72; 161—19; 264—232, 256, 299, 309, 313